United States Patent
Jassal et al.

(10) Patent No.: US 10,910,916 B2
(45) Date of Patent: Feb. 2, 2021

(54) FLUID COOLED AND FLUID INSULATED ELECTRIC MACHINE

(71) Applicant: GENERAL ELECTRIC COMPANY, Schenectady, NY (US)

(72) Inventors: Anoop Kumar Jassal, Schenectady, NY (US); Mohamed Osama, Garching (DE); Francesco Papini, Munich (DE); Narendra Digamber Joshi, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 219 days.

(21) Appl. No.: 15/827,335

(22) Filed: Nov. 30, 2017

(65) Prior Publication Data
US 2019/0165652 A1    May 30, 2019

(51) Int. Cl.
| | | |
|---|---|---|
| *H02K 9/08* | (2006.01) | |
| *H02K 3/22* | (2006.01) | |
| *H02K 3/12* | (2006.01) | |
| *H02K 1/32* | (2006.01) | |
| *H02K 3/24* | (2006.01) | |
| *H02K 9/197* | (2006.01) | |

(Continued)

(52) U.S. Cl.
CPC ............... *H02K 9/08* (2013.01); *H02K 1/32* (2013.01); *H02K 3/12* (2013.01); *H02K 3/24* (2013.01); *H02K 3/30* (2013.01); *H02K 9/005* (2013.01); *H02K 9/197* (2013.01); *H02K 3/22* (2013.01); *H02K 3/34* (2013.01)

(58) Field of Classification Search
CPC .. H02K 1/32; H02K 3/12; H02K 3/22; H02K 9/08; H02K 3/24; H02K 3/30; H02K 3/34; H02K 9/005; H02K 9/197

USPC .......................................................... 310/54
See application file for complete search history.

(56) References Cited

U.S. PATENT DOCUMENTS

| | | | |
|---|---|---|---|
| 3,049,633 A * | 8/1962 | Cain ...................... | H02K 3/22 |
| | | | 310/54 |
| 3,753,013 A | 8/1973 | Beermann | |

(Continued)

FOREIGN PATENT DOCUMENTS

| | | |
|---|---|---|
| CN | 1057551 | 1/1992 |
| CN | 1202028 | 5/2005 |

(Continued)

OTHER PUBLICATIONS

Saums, "Applications of Vaporizable Dielectric Fluid Cooling for IGBT Power Semiconductors", 27th Annual IEEE Semiconductor Thermal Measurement and Management Symposium (SEMI-THERM), http://ieeexplore.ieee.org/document/5767209/, Mar. 20-24, 2011.

(Continued)

*Primary Examiner* — Alex W Mok
(74) *Attorney, Agent, or Firm* — Mary D. Lawlor; The Small Patent Law Group LLC (57) ABSTRACT

An electric machine comprising a rotor, a stator, a plurality of bare conductors forming a plurality of windings in at least one of the stator and the rotor, and a fluid in direct physical contact with a plurality of outer surfaces of the plurality of bare conductors, wherein the fluid is electrically insulating and provides direct fluid cooling, to provide cooling for the plurality of bare conductors and electrical insulation between consecutive bare conductors of the plurality of bare conductors.

20 Claims, 11 Drawing Sheets

(51) Int. Cl.
  *H02K 9/00* (2006.01)
  *H02K 3/30* (2006.01)
  *H02K 3/34* (2006.01)

(56) References Cited

U.S. PATENT DOCUMENTS

| | | | | |
|---|---|---|---|---|
| 3,977,378 | A * | 8/1976 | Harned | F02M 31/005 123/553 |
| 2002/0063487 | A1 | 5/2002 | Leijon | |
| 2002/0180284 | A1* | 12/2002 | LeFlem | H02K 3/24 310/54 |
| 2007/0138878 | A1* | 6/2007 | Down | H02K 3/24 310/54 |
| 2012/0248904 | A1* | 10/2012 | Baumann | H02K 9/197 310/54 |
| 2012/0305226 | A1* | 12/2012 | Chamberlin | H02K 5/20 165/121 |
| 2013/0033145 | A1* | 2/2013 | Randolph | H02K 3/30 310/215 |
| 2013/0069455 | A1* | 3/2013 | Hamer | H02K 5/20 310/54 |
| 2013/0140924 | A1* | 6/2013 | Glubrecht | H02K 1/20 310/59 |
| 2013/0147289 | A1* | 6/2013 | Burger | H02K 9/19 310/54 |
| 2014/0139061 | A1* | 5/2014 | Gutjahr | H02K 9/197 310/86 |
| 2014/0252775 | A1* | 9/2014 | Hillerbrandt | H01F 27/40 290/55 |
| 2014/0300220 | A1 | 10/2014 | Marvin | |
| 2015/0123506 | A1* | 5/2015 | Salas Nobrega | H02K 1/274 310/87 |
| 2015/0364229 | A1* | 12/2015 | Singha | H01B 3/22 174/30 |
| 2015/0376534 | A1* | 12/2015 | Thompson | C10M 105/42 508/496 |
| 2016/0087509 | A1* | 3/2016 | Rippel | H02K 5/20 310/59 |
| 2016/0156251 | A1* | 6/2016 | Sakurai | H02K 9/06 310/54 |
| 2016/0226327 | A1 | 8/2016 | Rippel et al. | |
| 2017/0063200 | A1 | 3/2017 | Tremelling et al. | |

FOREIGN PATENT DOCUMENTS

| | | |
|---|---|---|
| CN | 1667918 | 9/2005 |
| CN | 1675814 | 9/2005 |
| CN | 103840569 | 6/2014 |
| CN | 105790479 | 7/2016 |
| CN | 104716765 | 8/2017 |
| WO | 2016107626 A2 | 7/2016 |
| WO | 2016164032 A1 | 10/2016 |

OTHER PUBLICATIONS

Dong et al., "Flow and Heat Transfer Characteristics of the two-Phase Cooling Fluid inside the Hollow Conductors of Evaporative Cooling Turbo-Generator", 19th International Conference on Electrical Machines and Systems (ICEMS), http://ieeexplore.ieee.org/document/7837109/, Nov. 3-16, 2016.
Li et al., "Influence of Rotor Radial Ventilation Ducts Number on Temperature Distribution of Rotor Excitation Winding and Fluid Flow State Between Two Poles of a Fully Air-Cooled Hydro-Generator", IEEE Transactions on Industrial Electronics, http://ieeexplore.ieee.org/document/7867843/, vol. 64, Issue 5, pp. 3767-3775, May 2017.
Chinese office action dated Jul. 10, 2020 for related application No. CN 2018114405919.

* cited by examiner

FLUID COOLED AND FLUID INSULATED ELECTRIC MACHINE

BACKGROUND

Embodiments of the present disclosure generally relate to electric machines and more specifically to fluid-based cooling of electric machines.

Electric machine is a general term for electric motors, electric generators and other electromagnetic devices, such as magnetic bearings, electromagnets, actuators, and eddy current brakes. An electric motor converts electricity to mechanical power while an electric generator converts mechanical power to electricity. An electric machine generally includes a rotor, a stator and windings of conductors. The conductors are wrapped around by at least one electrical insulator. The electrical insulator isolates the conductors from one another and from other components of the electric machine.

With advancement in technology, electric machines with increased torque and power densities are required. The increase in torque and power densities of the electric machines may be attained by optimizing design of the electric machines, using superior materials for manufacturing the electric machines, using advanced manufacturing processes, or effective cooling of the electric machines.

Typically, various methods and designs are used for cooling the electric machines and parts thereof. In these techniques, one or more coolants such as air, liquid (for example oil), gas or fuel are typically used. For example, one method involves blowing air through the center of the electric machine. Another method involves usage of liquid for cooling the electric machine. Liquid cooling facilitates generation of compact electric machine designs, and hence liquid cooling is preferred for high power applications.

Generally, for liquid cooling, a cooling jacket may be wrapped around the outside of the stator. The cooling jacket includes an aluminum extrusion that surrounds the outside of the stator and has passages for liquid coolant to pass through. This design cools the stator better than air, but is limited at least by thermal conductivity between the cooling jacket and the stator, and poor thermal conductivity of laminations of the stator. Another conventional liquid cooling method transmits cooling fluid through laminations of the stator or into slots cut into the laminations of the stator. Yet another conventional liquid cooling method is a wet stator cooling method. In the wet stator cooling method, the rotor is sealed away from the stator, and the stator is immersed in flowing liquid coolant.

However, the conventional cooling methods including the cooling methods discussed above may not provide the desired cooling effectiveness due to usage of the electrical insulator.

Hence, there is a need of improved cooling and insulation methods.

BRIEF DESCRIPTION

In accordance with one embodiment, an electric machine is presented. The electric machine includes a rotor, a stator, a plurality of bare conductors forming a plurality of windings in at least one of the stator and the rotor, and a fluid in direct physical contact with a plurality of outer surfaces of the plurality of bare conductors, wherein the fluid is electrically insulating and provides direct fluid cooling for the plurality of bare conductors and electrical insulation between consecutive bare conductors of the plurality of bare conductors In accordance with another embodiment, an electric machine is presented. The electric machine includes a stator, a plurality of bare conductors forming a plurality of windings in the stator, and a fluid in direct physical contact with a plurality of outer surfaces of the plurality of bare conductors, wherein the fluid is electrically insulating and provides direct fluid cooling for the plurality of bare conductors and electrical insulation between consecutive bare conductors of the plurality of bare conductors.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items.

As noted earlier, the conventional cooling methods may not provide the desired cooling effectiveness, at least in part, due to usage of the electrical insulator, which isolates the conductors from the coolant. Hence, the electrical insulator acts as a barrier for heat transfer between the conductors and the coolant. The addition of layers and levels of electrical insulators on the conductors and high heat resistance of the electrical insulators further reduces the effectiveness of the conventional cooling methods. Embodiments of the disclosure address the noted shortcomings in the art by providing direct cooling of the bare conductors using an electrically insulating fluid.

As used herein, the term "bare conductors" refers to conductors that do not have a layer of solid insulation and an outer surface of the conductors is directly exposed to the external environment surrounding the conductors. For example, when the windings are made using copper conductors, the copper conductors are not covered by a mica turn tape, a mica ground wall tape, a conductive tape, a stress grading tape, an armor/protective tape or any other solid insulators known in the art.

Figure 1:
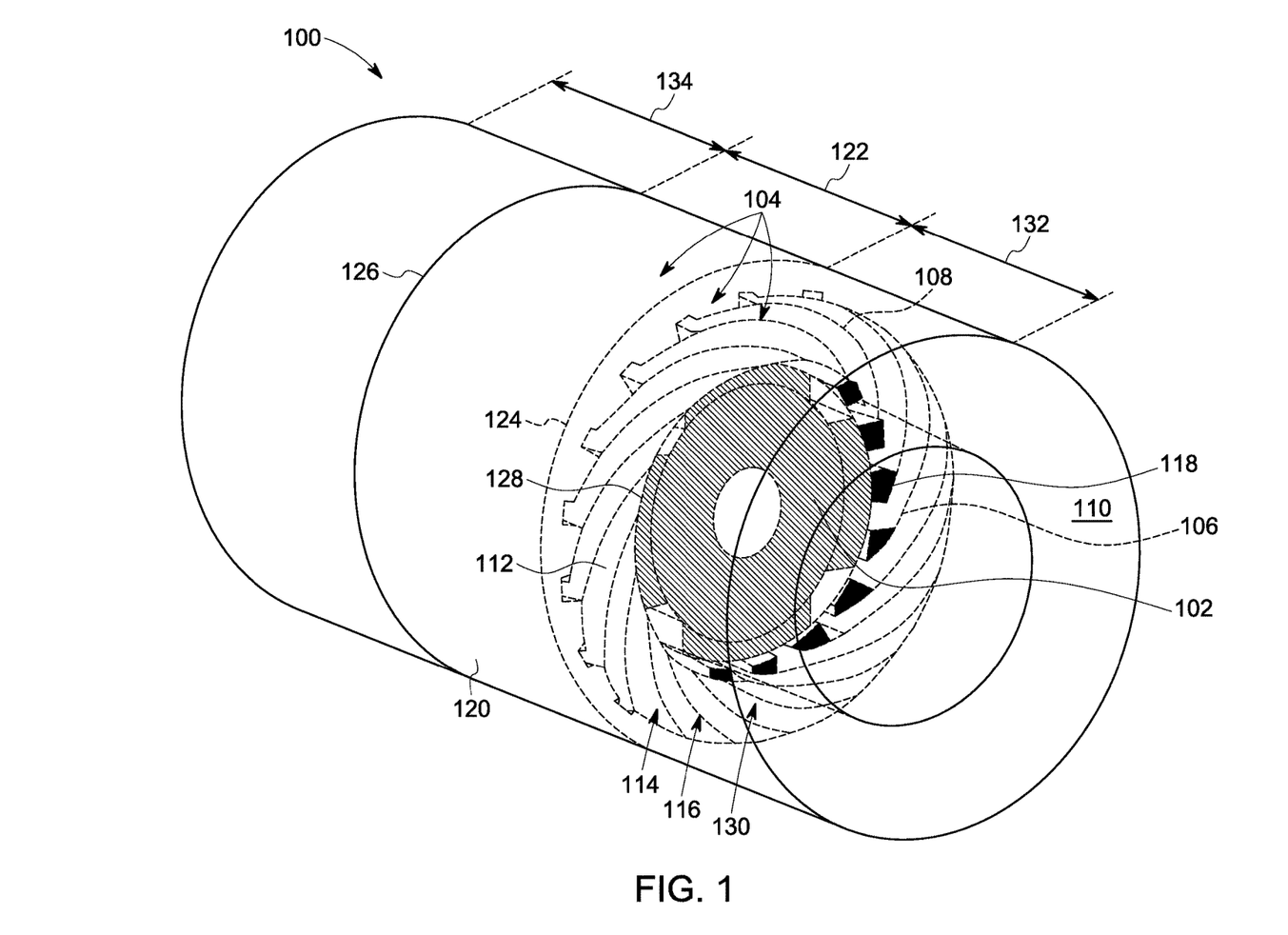
FIG. 1 is a diagrammatic illustration of an electric machine, in accordance with one embodiment of the present disclosure.

FIG. 1 is a diagrammatic illustration of an electric machine 100. The electric machine 100, for example may include an electric motor, an electric generator or an electromagnetic device. It is noted that the configuration and design of the electric machine 100 shown in FIG. 1 is an example, and the configuration and design of the electric machine 100 should not be restricted to FIG. 1.

The electric machine 100 includes a rotor 102, a stator 104 and a plurality of windings 106 formed using a plurality of bare conductors 108. Hereinafter, the terms "windings" and "plurality of windings" will be interchangeably used. Furthermore, hereinafter, the terms "bare conductors" and "plurality of bare conductors" will be interchangeably used. The windings 106 are formed in at least one of the rotor 102 and the stator 104. In the presently contemplated configuration, the windings 106 are formed in the stator 104. In alternative embodiments, the windings 106 may be formed in a rotor of an electric machine (not shown in Figures).

The electric machine 100 further includes a fluid 110. The fluid 110 is in direct physical contact with a plurality of outer surfaces 112 of the bare conductors 108, wherein the fluid 110 provides direct fluid cooling and is electrically insulating to provide cooling for the plurality of bare conductors 108 and electrical insulation between consecutive bare conductors of the plurality of bare conductors 108. Particularly, the bare conductors 108 are immersed inside the fluid 110. The fluid 110 provides an external environment to the bare conductors 108 such that the outer surfaces 112 of the bare conductors 108 are in direct physical contact with the fluid 110. The fluid 110 may continuously enter the electric machine 100, flow through the electric machine 100 and exit the electric machine 100, to provide direct fluid cooling. The flow of the fluid 110 through the electric machine 100 heats the fluid 110 and cools the bare conductors 108 resulting in a heated fluid (not shown). After exiting the electric machine 100, the heated fluid may be circulated through a heat sink (not shown) located outside the electric machine 100. The heat sink, for example may include a heat exchanger, fins, or the like. The circulation of the heated fluid through the heat sink may result in dissipation of heat resulting in cooled fluid (not shown). The cooled fluid may be recirculated within the electric machine 100 as fluid 110.

By way of a non-limiting example, the fluid 110 includes mineral oil, 3M™ Fluorinert™ Electronic Liquids, such as FC-3283, FC-40 and FC-43. By way of another non-limiting example, the fluid 110 may include 3M™ Novec™ Engineered Fluids such as Novec 7500 and Novec 7600. The fluid 110 is characterized by one or more of: high dielectric strength, high specific heat capacity, high volume electric resistivity, and is electrically insulating to provide cooling for the bare conductors 108 and provide electrical insulation between consecutive bare conductors in the bare conductors 108. The high dielectric strength refers to a dielectric strength equal to or greater than 15 kilo Volts per millimeter. The high specific heat capacity refers to a heat capacity equal to or greater than 1100 Joule per kilogram kelvin. The high-volume electric resistivity includes a volume electric resistivity equal to or greater than $10^8$ ohm centimeters.

Additionally, the fluid 110 may be characterized by high corrosion resistance, low dynamic viscosity, high dielectric constant, and high boiling temperature. The high dielectric constant includes a dielectric constant having a value equal to or greater than 5 per 1 kilo hertz. The low dynamic viscosity, for example includes viscosity less than $1.65*10^{-2}$ pascal second. The high boiling point, for example includes boiling point greater than 110 degrees centigrade.

Furthermore, in some embodiments, the fluid 110 may provide electrical insulation between the bare conductors 108 and electrically insulating components (not shown in FIG. 1), and between the bare conductors 108 and magnetic flux carrying components (not shown in FIG. 1) in the electrical machine 100. Additionally, the fluid 110 may also provide electrical insulation between electrically conductive components and the bare conductors of the electric machine 100. By way of a non-limiting example, the electrically insulating components, for example may include support structure for the bare conductors 108, wedges, or the like. Again, by way of a non-limiting example, the magnetic flux carrying components may include tooth and back iron parts, or, the like. Furthermore, the electrically conductive components may include shaft, enclosure of the electric machine 100, bearings, or the like.

The electric machine 100 may further include a plurality of slots 118 for holding the bare conductors 108. In the embodiment of FIG. 1, the stator 104 includes the slots 118. In alternative embodiments, a rotor of an electric machine may include slots for holding the bare conductors 108. In the embodiment of FIG. 1, the stator 104 includes a ferromagnetic core 120, and the slots 118 are formed in the ferromagnetic core 120. It is noted that certain electric machines, such as, slotless electric machines may not include slots for holding the bare conductors 108. In such embodiments, the bare conductors 108 form air gap windings (not shown).

Figure 2:
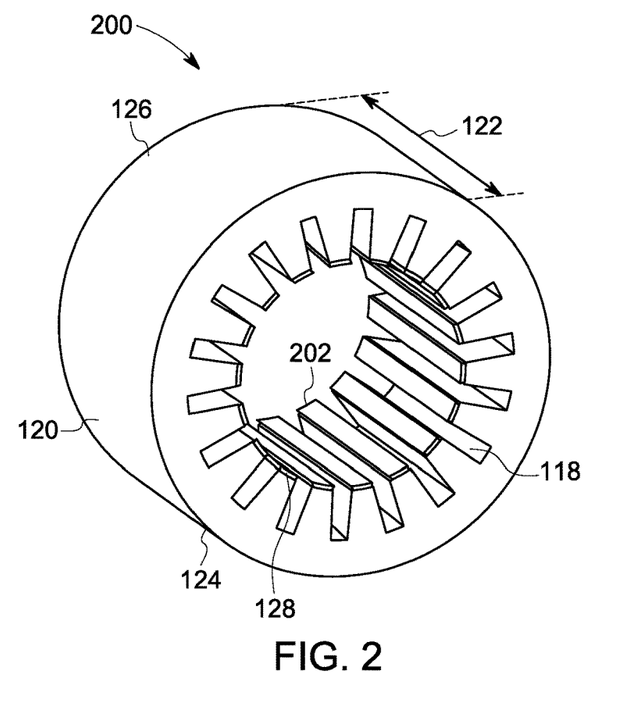
FIG. 2 is an example of the ferromagnetic core referred to in FIG. 1.

Referring now to FIG. 2, an example of the ferromagnetic core 120 is shown. FIG. 2 is a perspective view 200 of the ferromagnetic core 120, in accordance with one embodiment of the present disclosure. FIG. 2 shows the slots 118 in the ferromagnetic core 120, without the rotor 102 and the windings 106 for ease of depiction. The ferromagnetic core 120 is characterized by a length 122, a first outer edge 124, a second outer edge 126, a first inner edge 128 and a second inner edge 202. The slots 118 extend along the length 122 of the ferromagnetic core 120. It is noted that in certain electric machines, the slots 118 may not be formed in the ferromagnetic core 120. It is noted that while the electric machine 102 includes the ferromagnetic core 120, certain electric machines such as superconducting electric machines may include a core made of one or both of a material including a ferromagnetic material and a non-ferromagnetic material.

Figure 3:
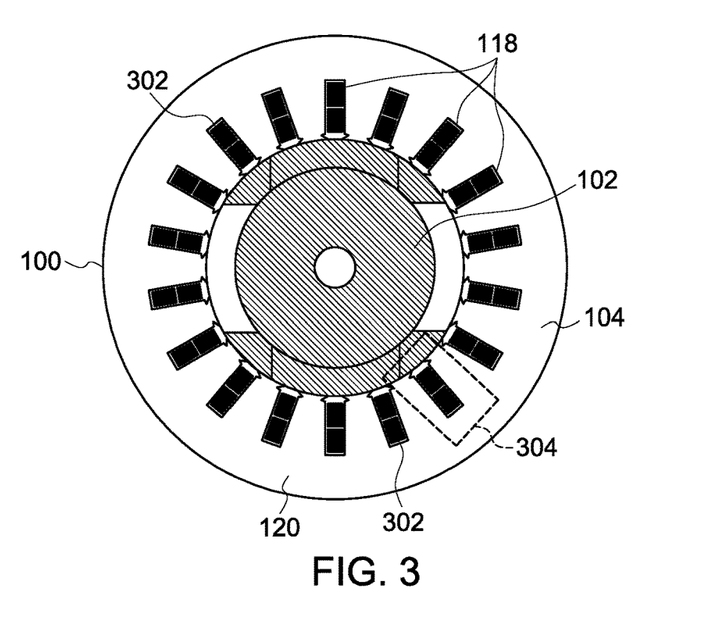
FIG. 3 is a cross-section of the electric machine referred to in FIG. 1, in accordance with an embodiment of the present disclosure.

Referring now to FIGS. 1 and 3, a portion 302 of the bare conductors 108 is stacked inside the slots 118 to form stacked windings 302 (shown in FIG. 3), and another portion 130 of the bare conductors 108 is disposed outside the ferromagnetic core 120 to form end windings 130 (shown in FIG. 1). For example, the end windings 130 extend beyond the first outer edge 124 and the first inner edge 128 of the ferromagnetic core 120. Similarly, the end windings 130 extend beyond the second outer edge 126 and the second inner edge 202 (shown in FIG. 2) of the ferromagnetic core 120. It is noted that the stacked windings 302 and the end windings 130 together are referred to as windings 106.

In some embodiments, one or more of the slots 118, include a plurality of support structures configured to mechanically hold and maintain a determined amount of distance between consecutive bare conductors of the bare conductors 108. Expanded view of a portion 304 of the electric machine 100, containing a slot 118 is illustrated in FIGS. 4 and 5.

Figure 4:
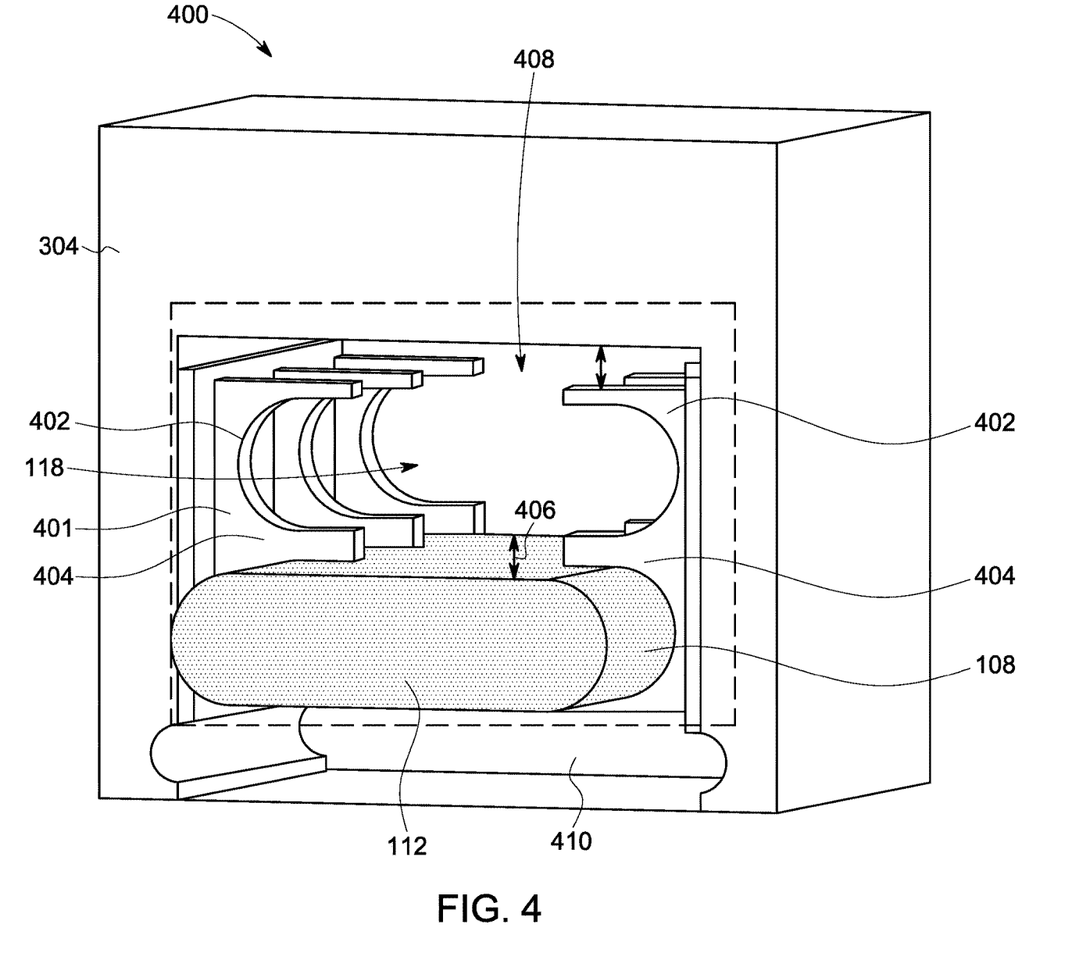
FIG. 4 is an expanded view of the portion of the electric machine referred to in FIG. 1, in accordance with an embodiment of the present disclosure.
Figure 5:
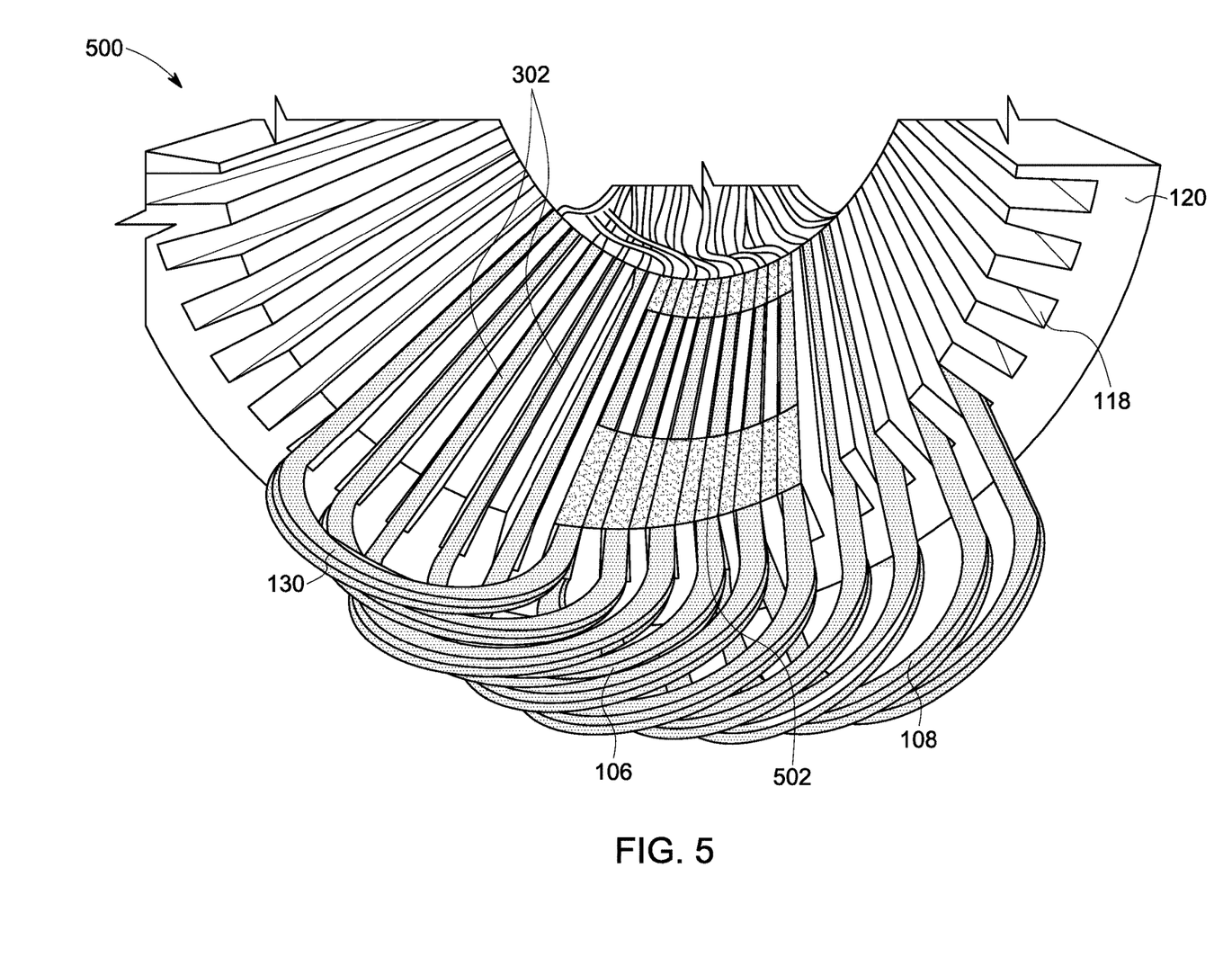
FIG. 5 is a pictorial view of a portion of the ferromagnetic core referred to in FIG. 1.

Referring now to FIG. 4, an expanded view 400 of the portion 304 of the electric machine 100 is shown, in accordance with certain embodiments of the present disclosure. In the presently contemplated configuration the portion 304 of the electric machine 100 is the portion of the stator 104, and in particular a portion of the ferromagnetic core 120, referred to in FIGS. 1-3.

In the presently contemplated configuration, the slot 118 includes a column 401. In the example embodiment illustrated in FIG. 4, the slot 118 includes the two support structures 402, 404. It is noted that the while the slot 118 is shown to include two support structures 402, 404, in certain embodiments the column may include more or less than the two support structures. The support structures 402, 404 may be electrically conductive or electrically non-conductive. As previously noted with reference to FIG. 3, the support structures 402, 404 are configured to mechanically hold and maintain a determined amount of distance (shown in FIG. 5) between consecutive bare conductors of the bare conductors 108. For ease of understanding, in FIG. 4, the first support structure 402 is shown without the bare conductor 108, and the second support structure 404 is shown as holding the bare conductor 108.

A plurality of gaps 406 may be formed between the support structures 402, 404. For example, as shown in FIG. 4, the gap 406 is formed between the first support structure 402 and the second support structure 404. The gap 406 maintains a determined amount of distance (shown in FIG. 5) between consecutive bare conductors 108.

The electric machine 100 may additionally include a gap 408 formed between one or more of the support structures 402, 404 and the portion 304 of the stator 104. For example, in the presently contemplated configuration, the gap 408 is formed between the first support structure 402 and the portion 304 of the electric machine 100. The slots 118 are immersed in the fluid 110 such that the gaps 406, 408, and gaps created by the determined amount of distance between the bare conductors are filled with the fluid 110. Accordingly, the arrangement of the support structures 402, 404, the gap 408, and the determined amount of distance between the bare conductors 108 enables the direct physical contact of the outer surfaces 112 of the bare conductors 108 with the fluid 110.

With continued reference to FIG. 4, reference numeral 410 shows a gap 410 for placement of a wedge (not shown), in accordance with some embodiments of the present disclosure. The wedge may seal the bare conductors 108 (not shown in FIG. 4) in the support structures 402, 404 and the respective slots 118. In certain embodiments, the wedge additionally seals the fluid 110 between the wedge and the slots 118 to provide a direct physical contact of the outer surfaces 112 of a portion of the bare conductors 108, used for formation of the stacked windings 302, to the fluid 110. Accordingly, the wedge prevents leaking of the fluid 110 from the slots 118. A portion of the ferromagnetic core 120 comprising the wedges mounted on the bare conductors in the slots 118 is shown with reference to FIG. 5.

Referring now to FIG. 5, a pictorial view 500 of a portion of the ferromagnetic core 120 is shown to illustrate wedges 502 mounted on the bare conductors 108 inside the slots 118, in accordance with certain embodiments of the present disclosure. In the embodiment of FIG. 5, the bare conductors 108 and the wedges 502 are disposed in a subset of the slots 118 to form a two turn per coil in the stacked windings 302, and the wedges 502 are thereafter disposed on the bare conductors 108.

Figure 6:
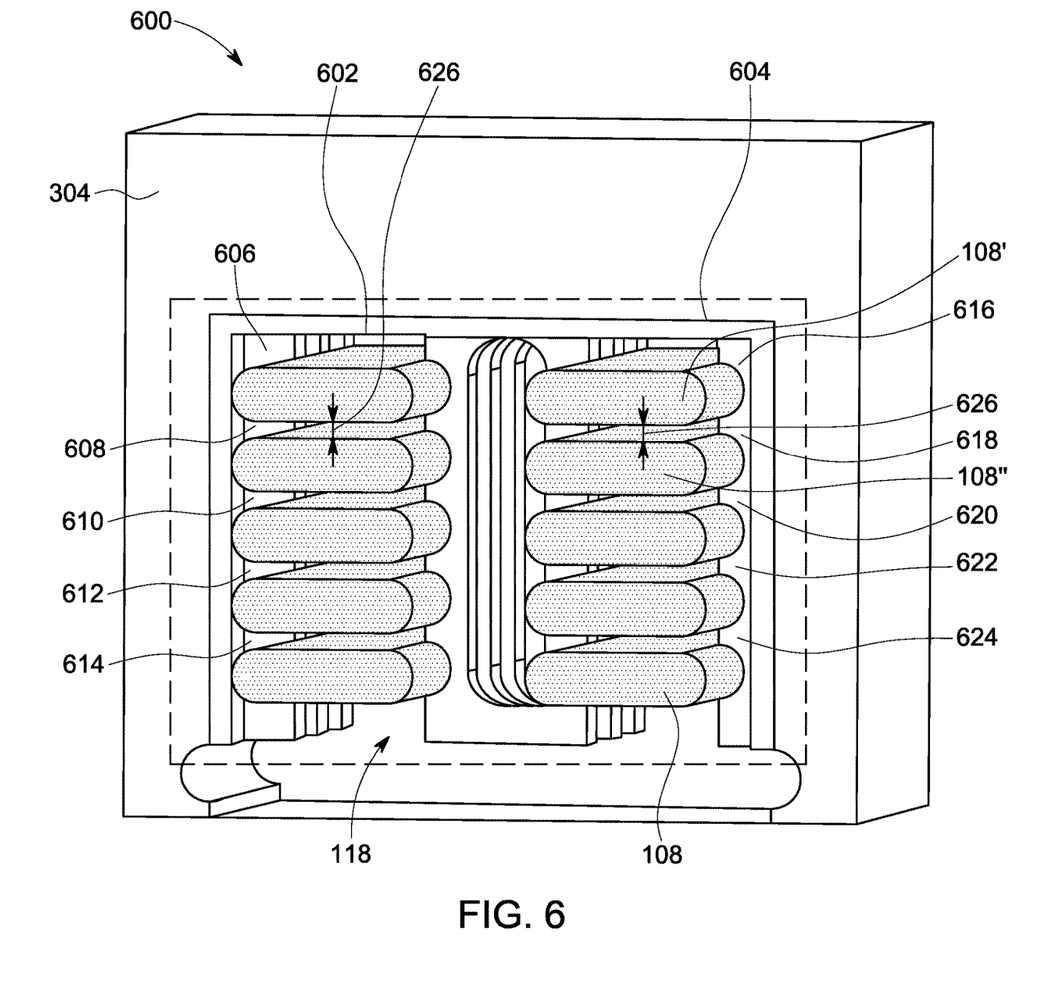
FIG. 6 is an expanded view of a portion of the electric machine referred to in FIG. 1, in accordance with an embodiment of the present disclosure.

Referring now to FIG. 6, an expanded view 600 of the portion 304 of the electric machine 100 is shown, in accordance with another embodiment of the present disclosure. In the embodiment illustrated in FIG. 6, the slot 118 includes two columns 602, 604 of support structures 606, 608, 610, 612, 614, 616, 618, 620, 622, 624. Each of the columns 602, 604 includes five support structures. Particularly, the first column 602 includes the support structures 606, 608, 610, 612, 614 and the second column 604 includes the support structures 616, 618, 620, 622, 624.

The support structures 606, 608, 610, 612, 614, 616, 618, 620, 622, 624 are configured to mechanically hold the bare conductors 108. Furthermore, the support structures 606, 608, 610, 612, 614, 616, 618, 620, 622, 624 are configured to maintain a determined amount of distance 626 between consecutive bare conductors. For example, the support structures 616 and 618 maintain the determined amount of distance 626 between a bare conductor 108' held by the support structure 616 and a bare conductor 108" held by the support structure 618.

Referring back to FIG. 1, the electric machine 100 may further include one or more shells 132, 134 configured to enclose the end windings 130 and to contain a portion of the fluid 110. In the presently contemplated configuration, the shell 132 extends from the first outer edge 124 till the first inner edge 128 of the ferromagnetic core 120 to enclose the end windings 130. Similarly, the shell 134 extends from the second outer edge 126 to the second inner edge 202 of the ferromagnetic core 120 to enclose the end windings 130. The shells 132, 134 are hollow and filled with the fluid 110. The shells 132, 134 are filled with the fluid 110 to provide a direct physical contact between the outer surfaces 112 of the end windings 130 and the fluid 110. As previously noted with reference to FIGS. 4 and 5, the slots 118 are filled with the fluid 110 and the wedge 502 (shown in FIG. 5) prevents leaking of the fluid 110. Accordingly, while the shells 132, 134 are configured to provide a direct physical contact of the fluid 110 with the outer surfaces 112 of the bare conductors 108 used for formation of the end windings 130, the slots 118 and the gaps 406, 408 (shown in FIG. 4) are configured to provide a direct physical contact between the outer surfaces 112 of the stacked windings 302 and the fluid 110.

Figure 7:
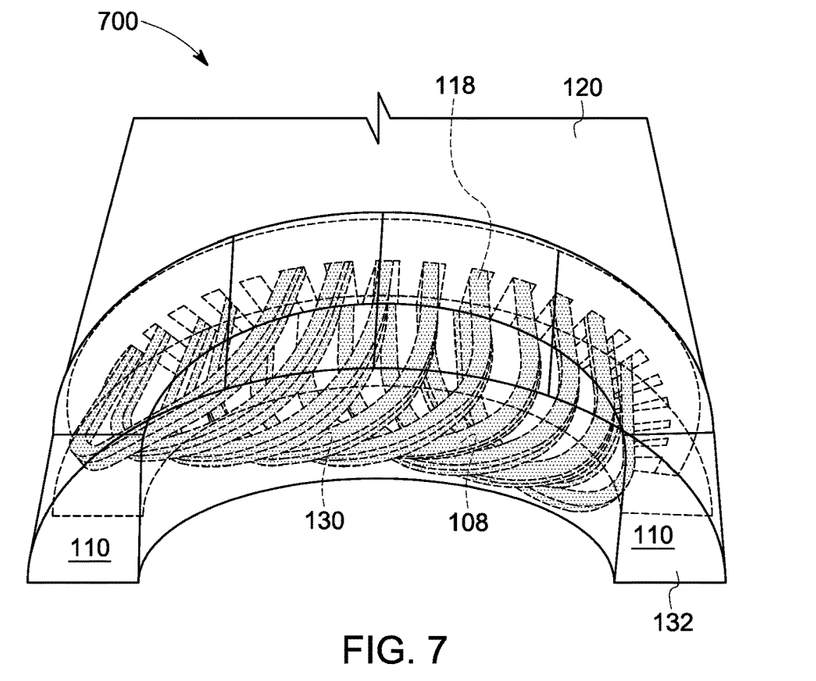
FIG. 7 is a pictorial representation of a portion of the electric machine, in accordance with an aspect of the present disclosure.

For ease of understanding, a portion of the electric machine 100 depicting the shell 132 is illustrated in FIG. 7.

Referring now to FIG. 7, a pictorial representation 700 of a portion of the electric machine 100 is shown, in accordance with one embodiment of the present disclosure. Particularly, FIG. 7 shows a portion of the ferromagnetic core 120 coupled to the shell 132, and the bare conductors 108 mounted in the slots 118 of ferromagnetic core 120. As shown in FIG. 7, the bare conductors 108 are disposed in the slots 118 such that the bare conductors 108 do not touch one another. The shell 132 is filled with the fluid 110 to provide a direct physical contact between the outer surfaces 112 of the end windings 130 and the fluid 110.

Figure 8:
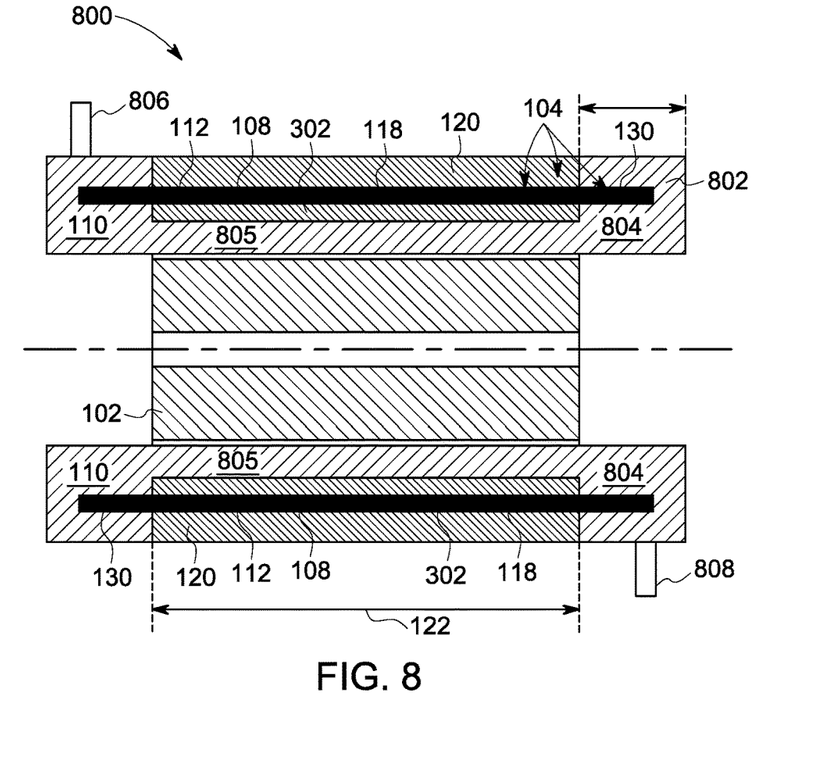
FIG. 8 is a radial cross-section view of an electric machine including a vessel, in accordance with an aspect of the present disclosure.

In certain embodiments, the shells 132, 134 may be replaced by a vessel shown in FIG. 8. Particularly, in some embodiments a vessel (shown in FIG. 8 and FIG. 3) may be provided to enclose the fluid 110 in an electric machine.

Referring now to FIG. 8, a radial cross-section view 800 of an electric machine 802 including a vessel 804 is shown, in accordance with one embodiment of the present disclosure. The components and respective reference numerals of the electric machine 802 remains similar to the components and respective reference numerals shown and used in FIG. 1, except that the electric machine 802 of FIG. 8 does not include the shells 132, 134. In the embodiment illustrated in FIG. 8, the electric machine 802 includes a vessel 804 to contain the fluid 110. The vessel 804 defines an internal volume 805 that is filled with the fluid 110. Hence, the vessel 804 is configured to contain the fluid 110 to provide the physical contact of the fluid 110 with the outer surfaces 112 of the bare conductors 108. The vessel 804 is configured to fluidically seal one or both of the rotor 102 and the stator 104 from the remaining components of the electric machine 802.

In the presently contemplated configuration, the stator 104 is disposed in the vessel 804 and the rotor 102 is disposed outside the vessel 804. As shown in FIG. 8, the vessel 804 extends along the length 122 of the ferromagnetic core 120 and further extends beyond the length of the end windings 130 to enclose the entire stator 104. For example, the ferromagnetic core 120, the slots 118, the stacked windings 302, the end windings 130, and the wedge (not shown in FIG. 8) are disposed in the vessel 804. In alternative embodiments, a rotor may be disposed in the vessel 804. The vessel 804 includes an inlet 806 for inflow of the fluid 110 and an outlet 808 for outflow of the fluid 110.

Figure 9:
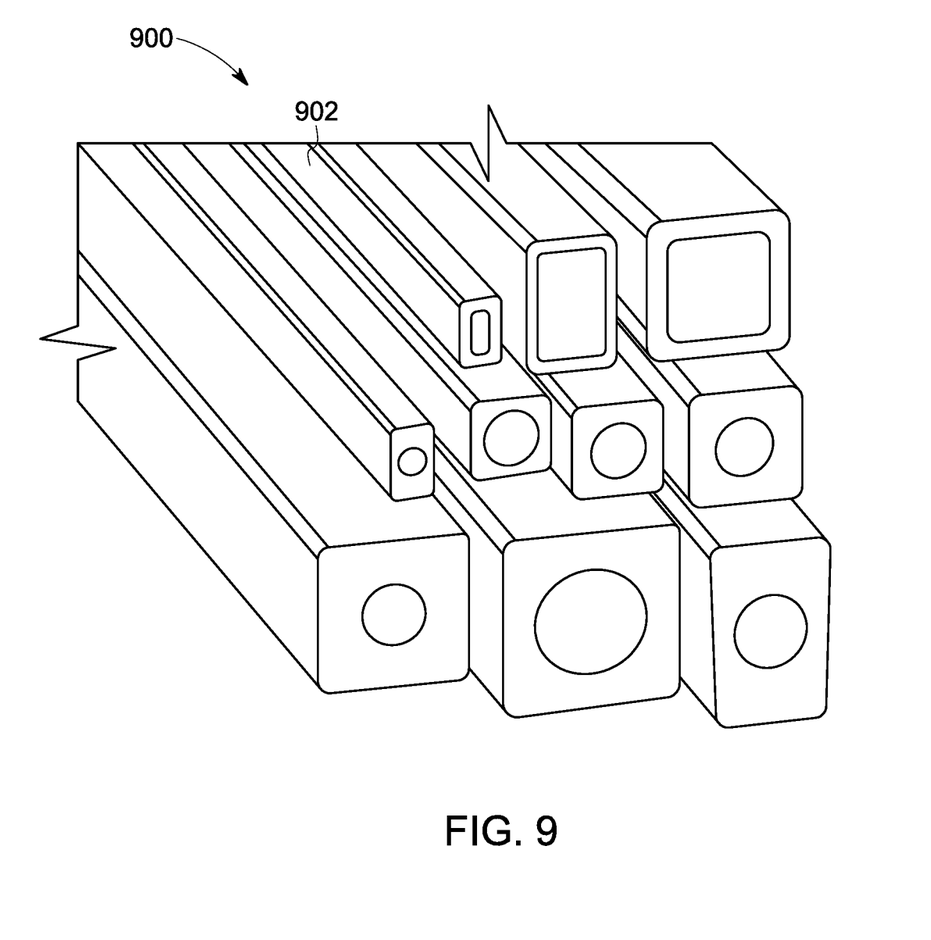
FIG. 9 shows a pictorial view of hollow conductors that may be used for formation of windings in the electric machine referred to in FIG. 1.

In some embodiments, the windings 106 may include bare solid conductors. In alternative embodiments, the windings 106 may include bare hollow conductors. FIG. 9 shows a pictorial view 900 of hollow conductors 902 that may be used for formation of the windings 106.

Figure 10:
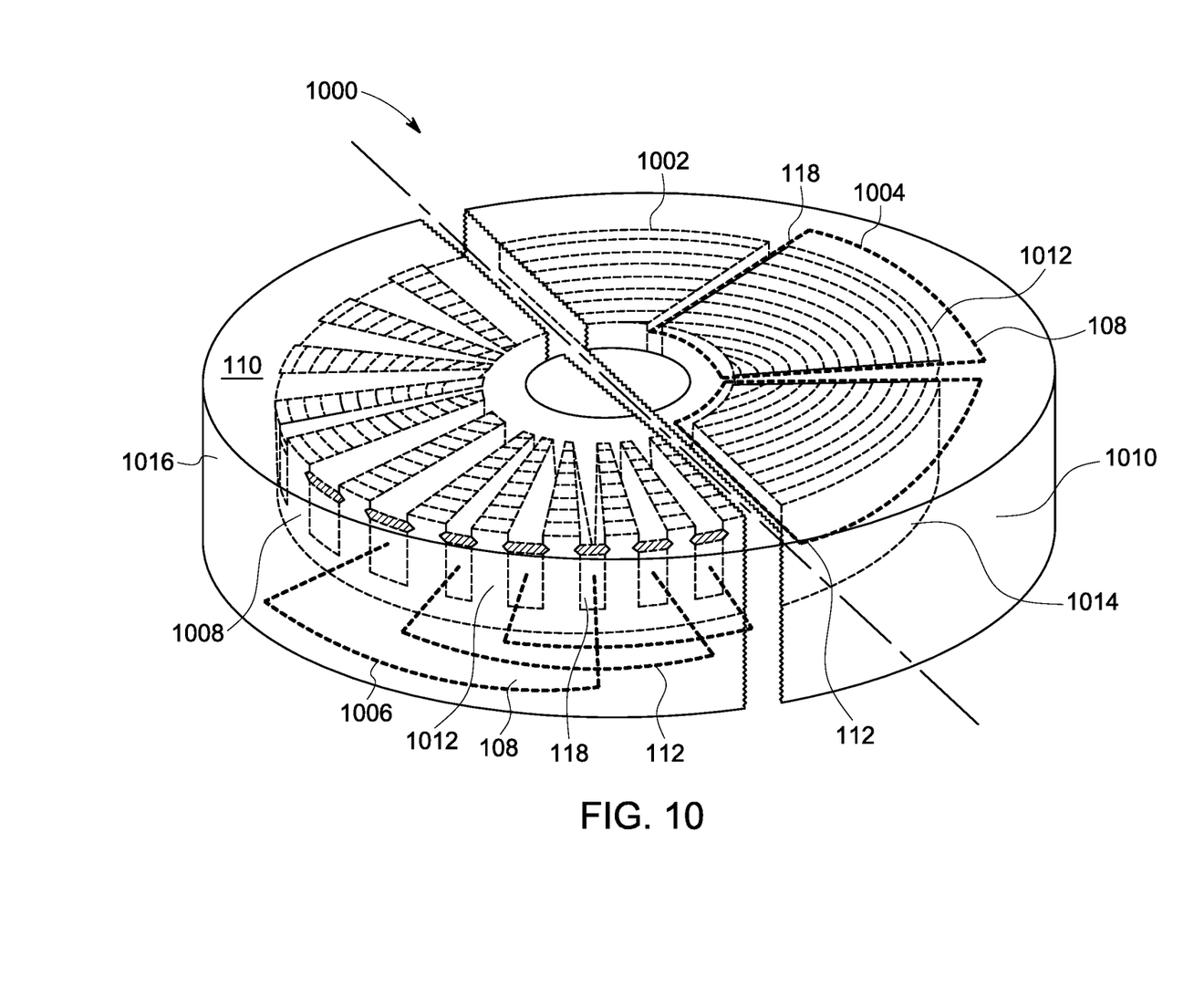
FIG. 10 shows a schematic representation of an electric machine having an axial flux electric machine topology, tooth wound windings and distributed windings, in accordance with one embodiment of the present disclosure.
Figure 11:
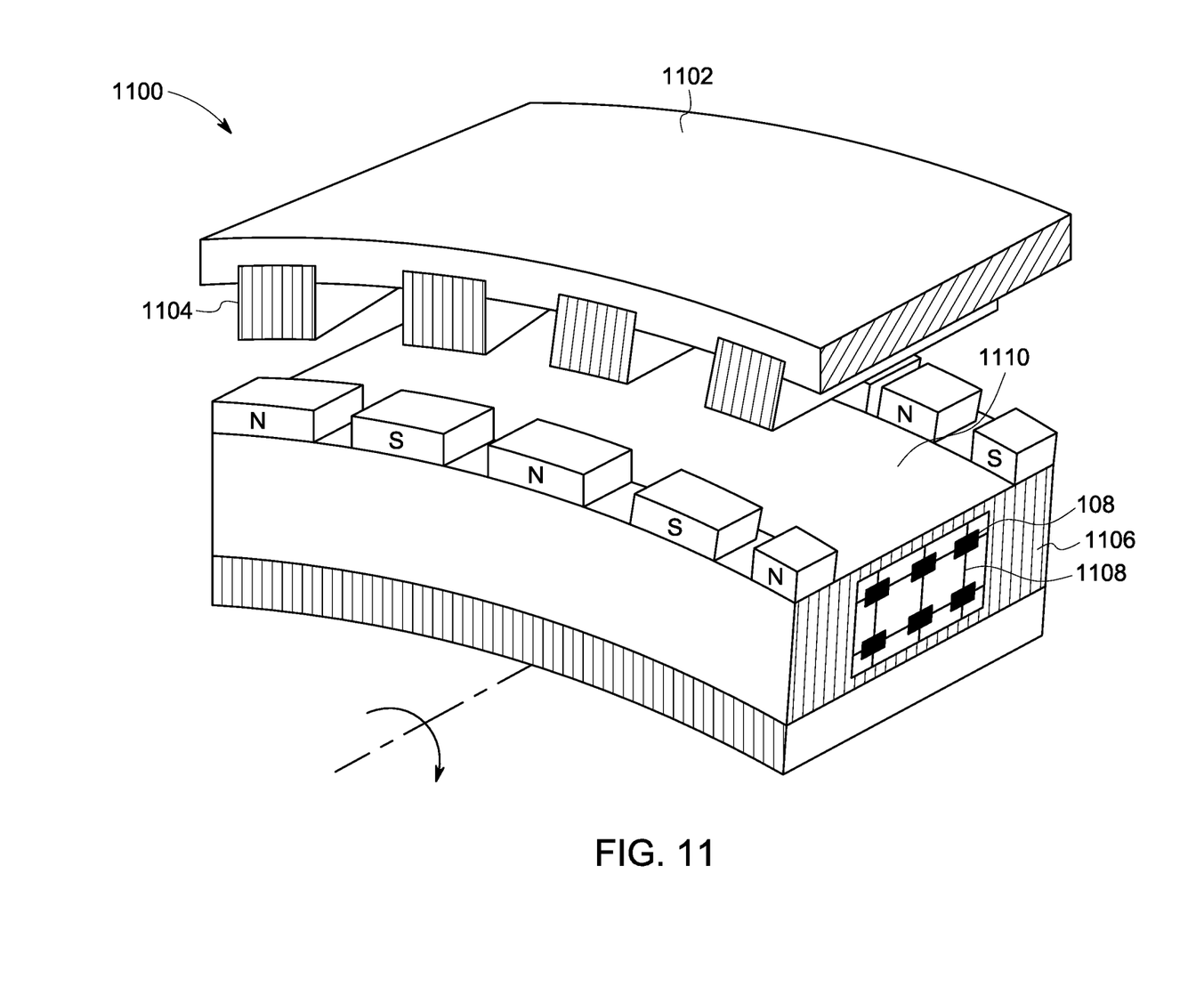
FIG. 11 shows a schematic representation of an electric machine having a transverse flux electric machine topology, in accordance with certain embodiments of the present disclosure.
Figure 12:
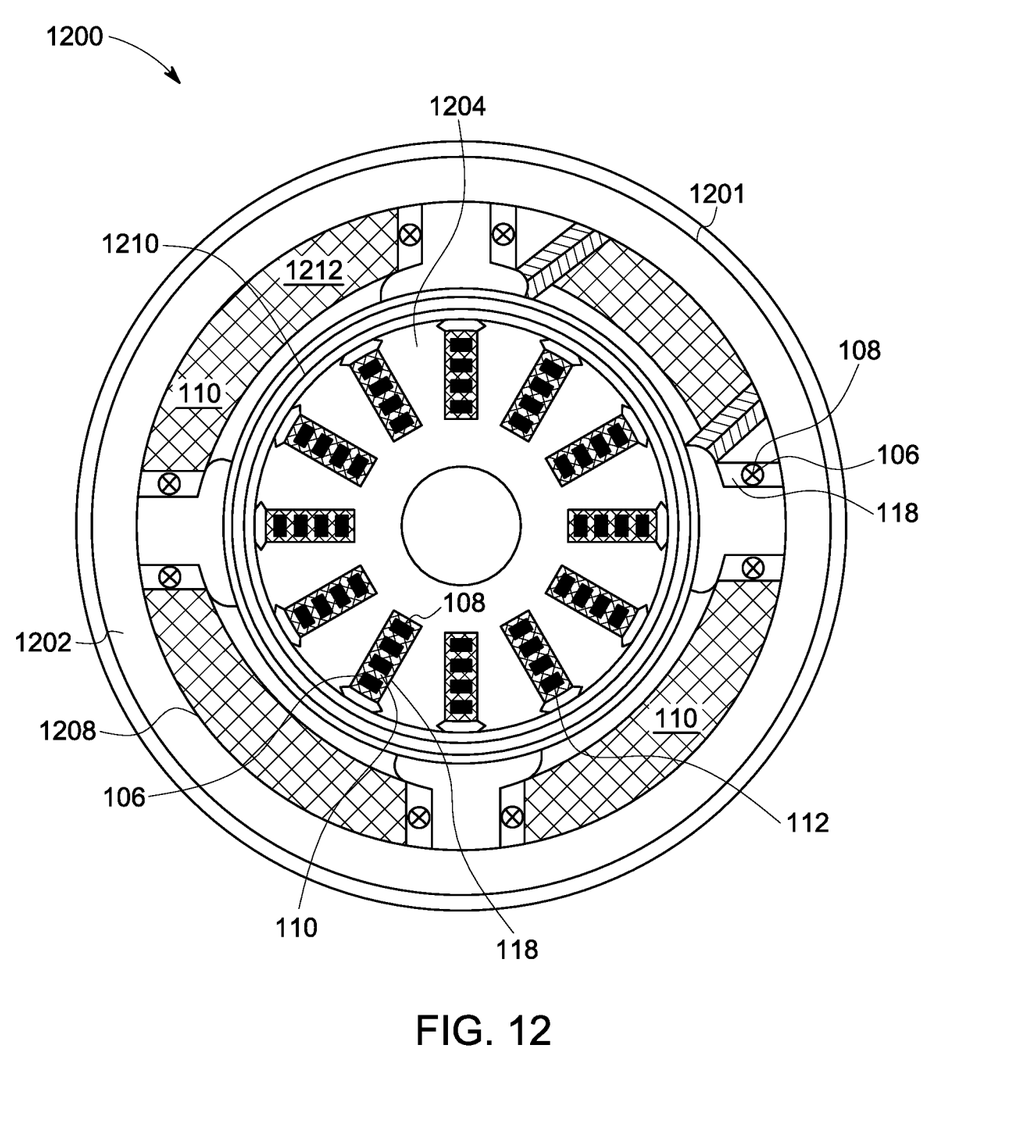
FIG. 12 is a cross-section of an electric machine including an outer rotor and an inner stator, in accordance with certain embodiments of the present disclosure.

The electric machine 100 may have at least one of a radial flux electric machine topology, an axial flux electric machine topology, and a transverse flux electric machine topology. In some embodiments, the electric machine 100 includes a radial flux topology. Furthermore, the windings 106 of the electric machine 100 may include one or both of tooth wound windings and distributed windings. FIGS. 10-12 show examples of electric machines having different types of topologies and windings.

FIG. 10 shows a schematic representation 1000 of an electric machine 1002 having an axial flux electric machine topology, tooth wound windings 1004 and distributed windings 1006, in accordance with one embodiment of the present disclosure. As shown in FIG. 10, a portion 1008 of the electric machine 1002 includes the distributed windings 1006 and another portion 1010 of the electric machine 1002 includes the tooth wound windings 1004. The electric machine 1002 includes a plurality of teeth 1012. The teeth 1012 includes the slots 118. Support structures 1014 similar to the support structures 402, 404 are formed inside the slots 118 of the tooth 1012. The bare conductors 108 are mounted on the support structures 1014. As shown in FIG. 10, the support structures 1014 hold the bare conductors and maintain a determined amount of distance between the bare conductors 108. The electric machine 1002 is enclosed in a vessel 1016 filled with the fluid 110. Due to the disposal of the electric machine 1002 inside the vessel 1016, the fluid 110 is in direct physical contact with the outer surfaces 112 of the bare conductors 108.

FIG. 11 shows a schematic representation 1100 of an electric machine 1102 having a transverse flux electric machine topology, in accordance with certain embodiments of the present disclosure. As shown in FIG. 11, the electric machine includes a rotor 1104 and a stator 1106. The stator 1106 includes a plurality of support structures 1108 to hold the bare conductors 108 and maintain a determined amount of distance between the bare conductors 108. Additionally, the electric machine 1102 includes a vessel 1110 to contain the fluid 110 (not shown in FIG. 11), and enable a direct physical contact between outer surfaces 112 of the bare conductors 108 and the fluid 110. The vessel 1110 seals the stator 1106 from the rotor 1104 and other components of the electric machine 1102

The embodiments discussed herein are with references to an electrical machine including a single rotor and a single stator. However, electric machines having multiple rotors and multiple stators are also envisaged within the scope of the present disclosure. Further configurations of electrical machines including an outer rotor an inner stator are also encompassed by the present disclosure. An example of an electric machine including an inner stator and outer rotor is shown with reference to FIG. 12.

FIG. 12 is a cross-section 1200 of an electric machine 1201 including an outer rotor 1202 and an inner stator 1204, in accordance with certain embodiments of the present disclosure. In the electric machine 1201 of FIG. 12, both the rotor 1202 and the stator 1204 include the windings 106 with the bare conductors 108. Accordingly, both the rotor 1202 and the stator 1204 includes the slots 118 and support structures (not visible in FIG. 12) formed in the respective slots. The support structures hold the bare conductors 108 to form the windings 106 in the rotor 1202 and the stator 1204. Furthermore, the support structures are configured to maintain a determined amount of distance between the bare conductors 108. Further, in the electric machine 1201 of FIG. 12, both the rotor 1202 and the stator 1204 include the vessels 1208, 1210, respectively. Both the vessel 1208 of the rotor 1202 and the vessel 1210 of the stator 1204 define an internal volume to contain the fluid 110 and provide a direct physical contact between the outer surfaces 112 of the bare conductors 108 and the fluid 110. The vessels 1208, 1210 seal the rotor 1202 from the stator 1204, and vice versa. Additionally, the vessels 1208, 1210 seal the rotor 1202 and the stator 1204 from remaining components of the electric machine 1201. Since the rotor 1202 includes the windings 106, the rotor 1202 is coupled to a rotor union mechanism. The rotor 1202 includes a cavity 1212 along a length of the rotor 1202. Particularly, the vessel 1208 includes the cavity 1212 along the length of the rotor 1202. The cavity 1212 is filled with the fluid 110. The rotor union mechanism is configured to circulate the fluid through the cavity 1212.

Figure 13:
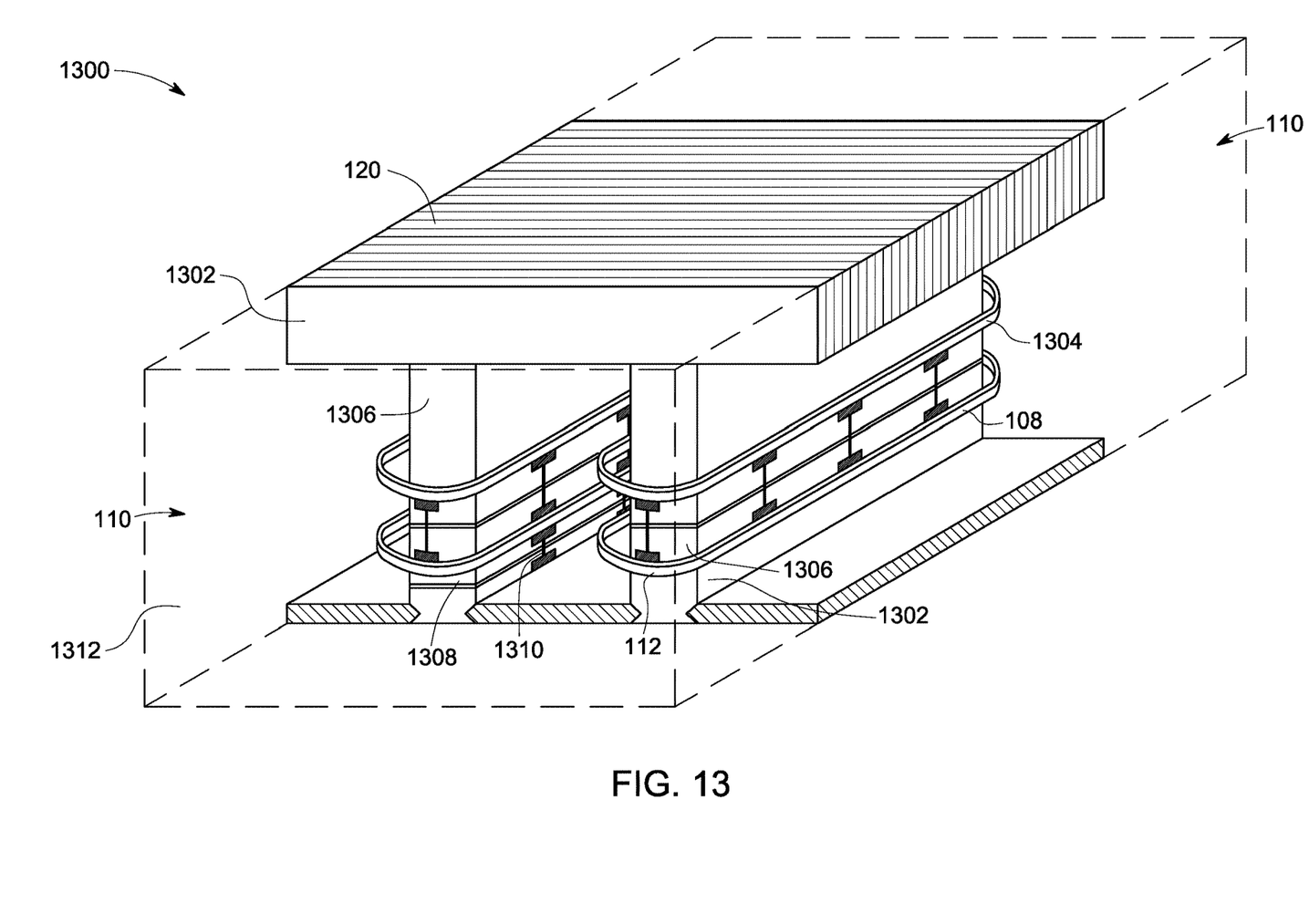
FIG. 13 shows a schematic representation of an electric machine having a radial flux electric machine topology and tooth wound windings, in accordance with one embodiment of the present disclosure.

FIG. 13 shows a schematic representation 1300 of an electric machine 1302 having a radial flux electric machine topology and tooth wound windings 1304, in accordance with one embodiment of the present disclosure. The electric machine 1302 includes a plurality of teeth 1306 and a plurality of slots 1308. Support structures 1310 similar to the support structures 402, 404 are formed inside the slots 1308.

The bare conductors 108 are mounted on the support structures 1310. As shown in FIG. 13, the support structures 1310 hold the bare conductors 108 and maintain a determined amount of distance between the bare conductors 108. The electric machine 1302 is enclosed in a vessel 1312 filled with the fluid 110. Due to the disposal of the electric machine 1302 inside the vessel 1312, the fluid 110 is in a direct physical contact with the outer surfaces 112 of the bare conductors 108.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An electric machine comprising:
a rotor;
a stator;
plural bare conductors forming plural windings in at least one of the stator or the rotor, the plural windings comprising stacked windings and end windings, the end windings extending beyond an outer edge of the at least one of the stator or the rotor, a first stacked winding of the stacked windings being disposed between the at least one of the stator or the rotor and a second stacked winding of the stacked windings;
a shell coupled with the outer edge of the at least one of the stator or the rotor at a first end of the at least one of the stator or the rotor, the shell configured to enclose the end windings extending beyond the outer edge of the at least one of the stator or the rotor; and
a fluid contained within the shell, the fluid configured to be in direct physical contact with at least the end windings extending beyond the outer edge of the at least one of the stator or the rotor and the stacked windings, wherein the fluid is electrically insulating, provides direct fluid cooling for the plural bare conductors and provides electrical insulation between the bare conductors,
wherein the at least one of the stator or the rotor comprises plural slots including a plurality of support structures configured to mechanically hold the plural bare conductors within the plural slots, each of the support structures comprising a surface configured to be in contact with a portion of an outer surface of one of the plural bare conductors to maintain a position of the one of the plural bare conductors within each of the plural slots, the support structures forming plural gaps disposed within the plural slots and separating consecutive bare conductors from each other by the plural gaps, wherein the fluid is configured to be directed within the gaps to be in physical contact with the plural bare conductors within the plural slots,
wherein a wedge is configured to be disposed within a wedge gap between the at least one of the rotor or the stator and the first stacked winding, wherein the wedge is configured to control an amount of the fluid that is contained within the plural slots.

2. The electric machine of claim 1, wherein the support structures are configured to maintain a distance between consecutive bare conductors of the plural bare conductors.

3. The electric machine of claim 2, wherein the plural gaps define the distance between the consecutive bare conductors of the plural bare conductors.

4. The electric machine of claim 1, wherein the wedge gap is disposed between the a least one of the stator or the rotor and at least one support structure of the plurality of support structures.

5. The electric machine of claim 1, wherein the stator further comprises a core, the plural bare conductors disposed within a core and the end windings extending within the shell beyond an outer edge of the core.

6. The electric machine of claim 1, further comprising a vessel, one or more of the rotor or the stator are disposed within the vessel, wherein the vessel defines an internal volume configured to contain at least some of the fluid.

7. The electric machine of claim 6, wherein the vessel is configured to contain the fluid to provide the physical contact of the fluid with at least the end windings extending beyond the outer edge of the at least one of the stator or the rotor within the shell and the plural bare conductors within the gaps.

8. The electric machine of claim 6, wherein the vessel is configured to fluidically seal the at least one of the stator or the rotor from remaining components of the electric machine.

9. The electric machine of claim 1, wherein the fluid fluidly isolates the plural bare conductors from a plurality of electrically conductive components in the electric machine.

10. The electric machine of claim 1, wherein the fluid is configured to electrical isolate at least one of the plural bare conductors from a plurality of electrically insulating components, and electrical isolates the plural bare conductors from a plurality of magnetic flux carrying components in the electric machine.

11. The electric machine of claim 1, wherein the fluid comprises one or both of a liquid and gas.

12. The electric machine of claim 1, wherein the fluid is characterized by a dielectric strength equal to or greater than 15 kilo Volts per millimeter, and a specific heat capacity equal to or greater than 1100 Joule per kilogram kelvin.

13. The electric machine of claim 1, wherein the plural bare conductors comprises at least one of bare solid conductors or bare hollow conductors.

14. The electric machine of claim 1, wherein the electric machine includes the rotor, wherein the rotor comprises:
a cavity along a length of the rotor; and
a rotor union mechanism configured to circulate the fluid through the cavity.

15. The electric machine of claim 1, wherein the electric machine has at least one of a radial flux electric machine topology, an axial flux electric machine topology, and a transverse flux electric machine topology.

16. The electric machine of claim 1, wherein plural windings comprise one or both of tooth wound windings and distributed windings.

17. An electric machine comprising:
a stator;
plural bare conductors forming plural windings in the stator, the plural windings comprising stacked windings and end windings, the end windings extending beyond an outer edge of the stator, a first stacked winding of the stacked windings being disposed between the stator and a second stacked winding of the stacked windings;
a vessel disposed at the outer edge of the stator, the vessel configured to enclose the end windings, the vessel configured to contain a fluid that is in direct physical contact with the end windings and the stacked windings, wherein the fluid is electrically insulating provides direct fluid cooling for the plural bare conductors and provides electrical insulation between the bare conductors; and plural slots including a plurality of support structures disposed within the stator, the support structures configured to mechanically hold the plural bare conductors within the plural slots, each of the support structures comprising a surface configured to be in contact with a portion of an outer surface of one of the plural bare conductors to maintain a position of the one of the plural bare conductors within each of the plural slots, the support structures forming plural gaps disposed within the plural slots and separating consecutive bare conductors from each other by the plural gaps, wherein the fluid is configured to fill the plural gaps to be in physical contact with the plural bare conductors within the plural slots, wherein a wedge is configured to be disposed within a wedge gap between the stator and the first stacked winding, wherein the wedge is configured to control an amount of the fluid that is contained within the plural slots.

18. The electric machine of claim 17, the plural support structures are configured to maintain a distance between consecutive bare conductors of the plural bare conductors.

19. The electric machine of claim 18, wherein the plural gaps define the distance between consecutive bare conductors of the plural bare conductors.

20. The electric machine of claim 18, wherein the fluid is configured to be in direct physical contact with the end windings extending beyond the outer edge of the stator and the plural bare conductors within the plural slots.

\* \* \* \* \*